(12) United States Patent
Safarli et al.

(10) Patent No.: US 9,595,798 B2
(45) Date of Patent: Mar. 14, 2017

(54) VME P2 FIVE ROW INTERFACE ADAPTER ASSEMBLY, SYSTEM, AND METHOD

(71) Applicant: THE BOEING COMPANY, Chicago, IL (US)

(72) Inventors: Artoush Safarli, Newcastle, WA (US); Patrick Jay McCuen, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/741,549

(22) Filed: Jun. 17, 2015

(65) Prior Publication Data
US 2016/0372877 A1  Dec. 22, 2016

(51) Int. Cl.
*H01R 13/04* (2006.01)
*H01R 24/68* (2011.01)

(52) U.S. Cl.
CPC .................... *H01R 24/68* (2013.01)

(58) Field of Classification Search
CPC ..... H01R 24/28; H01R 24/68; H05K 2201/44
USPC .................. 439/692, 61, 485; 361/788, 785
See application file for complete search history.

(56) References Cited

U.S. PATENT DOCUMENTS

| | | | | |
|---|---|---|---|---|
| 4,047,781 A | * | 9/1977 | DeNigris | H01R 31/08 361/752 |
| 4,479,238 A | * | 10/1984 | Spector | H03G 5/04 361/725 |
| 4,550,960 A | * | 11/1985 | Asick | H01R 13/65802 439/108 |
| 4,744,006 A | * | 5/1988 | Duffield | G06F 1/184 361/679.32 |
| 4,845,609 A | | 7/1989 | Lighthart | |
| 4,950,169 A | * | 8/1990 | Martin | H01R 29/00 439/44 |
| 5,040,995 A | * | 8/1991 | Graninger | H01R 12/58 361/736 |
| 5,055,069 A | * | 10/1991 | Townsend | H01R 23/688 439/607.11 |
| 5,103,378 A | * | 4/1992 | Stowers | H05K 7/1425 211/41.17 |
| 5,175,536 A | | 12/1992 | Aschliman | |

(Continued)

OTHER PUBLICATIONS

Extended European Search Report for EP 16170455.6, dated Oct. 7, 2016.

*Primary Examiner* — Abdullah Riyami
*Assistant Examiner* — Nader Alhawamdeh
(74) *Attorney, Agent, or Firm* — Joseph M. Butscher; The Small Patent Law Group, LLC

(57) ABSTRACT

A Versa Module Europa (VME) adapter assembly is configured to operatively couple a subsystem to a five row VME64x chassis. The VME adapter assembly includes an adapter circuit board having a mating contact area proximate to a chassis-mating edge, and at least one area proximate to a system-connecting edge that is configured to couple to the subsystem. A mating plug housing is coupled to the mating contact area and may include a chassis interface insert defining a mating interface area having five aligned rows of contact apertures. The five aligned rows of contact apertures are configured to mate with a same number of aligned rows of contact pins within a backplane connector of the five row VME64x chassis.

28 Claims, 5 Drawing Sheets

(56) References Cited

U.S. PATENT DOCUMENTS

| | | | | |
|---|---|---|---|---|
| 5,348,482 A * | 9/1994 | Rudy, Jr. | H05K 7/1449 | 361/725 |
| 5,692,043 A * | 11/1997 | Gliga | H04Q 3/60 | 361/788 |
| 5,827,074 A * | 10/1998 | Gatti | H05K 7/1441 | 439/61 |
| 5,873,738 A * | 2/1999 | Shimada | H01R 23/6873 | 439/61 |
| 6,104,613 A * | 8/2000 | Urda | H05K 7/1461 | 165/185 |
| 6,392,142 B1 * | 5/2002 | Uzuka | H05K 1/14 | 174/541 |
| 7,042,737 B1 * | 5/2006 | Woolsey | H05K 7/1445 | 174/384 |
| 7,338,325 B2 * | 3/2008 | Yin | H01R 31/065 | 439/638 |
| 7,458,815 B2 * | 12/2008 | Fallah-Adl | H05K 7/1451 | 361/695 |
| 7,570,487 B2 * | 8/2009 | Clark | H04Q 1/13 | 361/715 |
| 7,602,611 B2 * | 10/2009 | Peng | G06F 1/181 | 361/728 |
| 7,618,262 B2 * | 11/2009 | Fogg | H01R 23/6873 | 439/11 |
| 7,898,819 B2 * | 3/2011 | Pfingsten | H01R 13/514 | 361/730 |
| 7,924,558 B2 * | 4/2011 | Crippen | G06F 1/185 | 345/419 |
| 7,995,346 B2 * | 8/2011 | Biemer | H05K 7/20563 | 312/223.2 |
| 8,345,426 B2 * | 1/2013 | Nichols | H05K 7/1418 | 165/80.2 |
| 8,345,440 B2 * | 1/2013 | Wu | H05K 7/1455 | 361/788 |
| 8,427,828 B2 * | 4/2013 | Kehret | G06F 1/183 | 165/104.33 |
| 8,477,498 B2 * | 7/2013 | Porreca | H05K 7/1404 | 361/696 |
| 8,714,666 B2 * | 5/2014 | Nagahori | H05K 7/20563 | 312/213 |
| 8,841,560 B1 * | 9/2014 | Roberts | H05K 1/141 | 174/261 |
| 8,861,222 B2 * | 10/2014 | Wen | H01R 12/7094 | 361/785 |
| 8,947,106 B2 * | 2/2015 | Michaelis | G01R 31/043 | 324/647 |
| 2005/0083670 A1 * | 4/2005 | Peloza | G02B 6/4201 | 361/801 |
| 2006/0133033 A1 * | 6/2006 | Straub, Jr. | H05K 7/20563 | 361/690 |
| 2006/0238991 A1 * | 10/2006 | Drako | G06F 1/185 | 361/796 |
| 2008/0045051 A1 * | 2/2008 | Sato | H05K 7/1409 | 439/78 |
| 2009/0029588 A1 * | 1/2009 | Neumetzler | H04Q 1/142 | 439/540.1 |
| 2009/0093140 A1 * | 4/2009 | Fogg | H01R 23/6873 | 439/65 |
| 2009/0219702 A1 * | 9/2009 | Mazura | H05K 7/1407 | 361/740 |
| 2010/0120266 A1 * | 5/2010 | Rimborg | H05K 7/1454 | 439/65 |
| 2010/0221931 A1 * | 9/2010 | Pepe | H01R 13/514 | 439/78 |
| 2011/0267776 A1 * | 11/2011 | Porreca | H05K 7/20545 | 361/694 |
| 2012/0295452 A1 | 11/2012 | McClellan | | |
| 2013/0140968 A1 * | 6/2013 | Nagahori | H05K 7/20563 | 312/223.1 |

* cited by examiner

VME P2 FIVE ROW INTERFACE ADAPTER ASSEMBLY, SYSTEM, AND METHOD

FIELD OF EMBODIMENTS OF THE DISCLOSURE

Embodiments of the present disclosure generally relate to Versa Module Europa P2 Five Row interface adapter assemblies, systems, and methods.

BACKGROUND OF THE DISCLOSURE

Versa Module Europa (VME) is a flexible, open-ended bus system that employs a Eurocard standard. A Eurocard is a type of printed circuit board that uses a plug-style connector, such as a 96 pin plug, rather than an edge connector. VME supports a variety of computational-intensive tasks.

VME32 uses separate 32-bit data and address buses. In order to allow different bus widths, VME32 uses two different Eurocard connectors, namely P1 and P2. One type of VME32 P1 includes three rows of 32 pins each. This type of VME32 P1 implements the first 24 address bits, 16 data bits, and all of the control signals. In addition to the structure and capabilities of VME32 P1, VME32 P2 uses additional address bits and 16 data bits.

With continued advancements in processing speeds and power, additional VME configurations have been developed. A known VME configuration, namely VME64x, includes five rows of 32 pins each, which improves VME addressing capability. Thus, a VME64x chassis may include connection interfaces of five rows of 32 pins each. While VME configurations have evolved (such as from VME32 to VME64x), certain systems that are configured to connect to VME chassis still use outdated VME mating connectors.

In many instances, individuals connect a mating connector having three rows of connection interfaces to a VME64x chassis having backplane connection interfaces of five rows. If the mating connector is not properly aligned with a connection interface of the VME64x chassis, the mating connector and/or the VME chassis may be damaged, such as by short-circuiting, burning, and the like.

A three row VME32 mating connector may be mated to a five row connection interface of a VME64x chassis, but may be offset with respect to a proper alignment. For example, a row of the mating connector may be offset such that it mates with an incompatible row of the VME64x chassis. Consequently, the VME64x system may electrically short. Further, component connections may burn due to the improper connections between the mating connector and the VME64x chassis.

Attempting to mate an external 28 volt direct current and ground to discrete input and output VME cards having a three row connector with a five row VME64x backplane often results in both offset and improper mating therebetween. Such misalignment may damage the connector and/or the VME64x chassis.

Accordingly, a need exists for properly and safely mating a subsystem with a five row VME64x backplane.

SUMMARY OF THE DISCLOSURE

Certain embodiments of the present disclosure provide a Versa Module Europa (VME) adapter assembly configured to operatively couple a subsystem to a five row VME chassis, such as a chassis of a VME64x system. The VME adapter assembly may include an adapter circuit board having a mating contact area proximate to a chassis-mating edge, and at least one area that is configured to couple to the subsystem. A mating plug housing may be coupled to the mating contact area. The mating plug housing may include a chassis interface insert defining a mating interface area having five aligned rows of contact apertures. The five aligned rows of contact apertures are configured to mate with a same number of aligned rows of contact pins within a backplane connector of the five row VME chassis.

The adapter circuit board may be a discrete input adapter circuit board. Optionally, the adapter circuit board may be a discrete output adapter circuit board. In at least one embodiment, the area(s) of the adapter circuit board may include a power contact area.

In at least one embodiment, the area(s) of the adapter circuit board may include an input contact area configured to couple to a first cable that connects to the subsystem, and an output contact area configured to couple to a second cable that couples to a different input contact area of a different VME adapter assembly. Also, at least one area of the adapter circuit board may include a plurality of configuration selection areas. Each of the configuration selection areas may be configured to allow for a desired selection of power and ground formation.

The mating contact area may include five rows of contacts connected to the five aligned rows of contact apertures. Less than all of the contacts within the mating contact area may be active. For example, each of the contacts within at least one of the five rows of the mating contact area may be deactivated (for example, not in use, such as not being operatively connected to a signal source, power source, or ground). In at least one embodiment, only two of the five rows within the mating contact area are active. One of the two of the five rows within the mating contact area may include alternating signal and ground contacts, and the other of the two of the five rows within the mating contact area may include only ground contacts.

At least one of the contacts within the mating contact area may include a keying shape configured to ensure proper orientation of the adapter circuit board with respect to the mating plug housing. At least one of the five rows within the mating contact area may include different shaped contacts to facilitate routing of traces therebetween.

Certain embodiments of the present disclosure provide a system that may include a subsystem, a five row VME chassis comprising a plurality of backplane connectors, and a plurality of Versa Module Europa (VME) adapter assemblies operatively coupling the subsystem to the five row VME chassis. The subsystem may be an electrical subsystem of a larger system, such as a test system within a laboratory or other such testing environment.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a VME adapter assembly that is configured to mate with a connection interface of a five row VME chassis, such as that of a VME64x system. The VME adapter assembly may be used to adapt a mating connector of a subsystem with a 5 row backplane connector of a VME chassis. The VME adapter assembly may be configured as a discrete input adapter or a discrete output adapter. Embodiments of the present disclosure are configured to eliminate, minimize, or otherwise reduce equipment damage and safety concerns that previously existed with VME systems that connected subsystems to a five row backplane connector of a VME64x chassis, for example. The VME adapter assemblies may include circuit boards that provide simple, configurable selections that may be used to define input/output personality.

Embodiments of the present disclosure may be configured for use with a commercial, off-the-shelf VME chassis, such as a five row VME64x chassis (that is, a VME64x chassis having five row backplane connectors). A VME mating connector may be connected to a VME adapter assembly having a complementary five row mating interface housing that safely connects to a backplane connector of the VME chassis. Embodiments of the present disclosure eliminate, minimize, or otherwise reduce risk of damage to VME hardware that could otherwise occur from incorrect insertion of a mating connector into a five row VME chassis.

Figure 1:
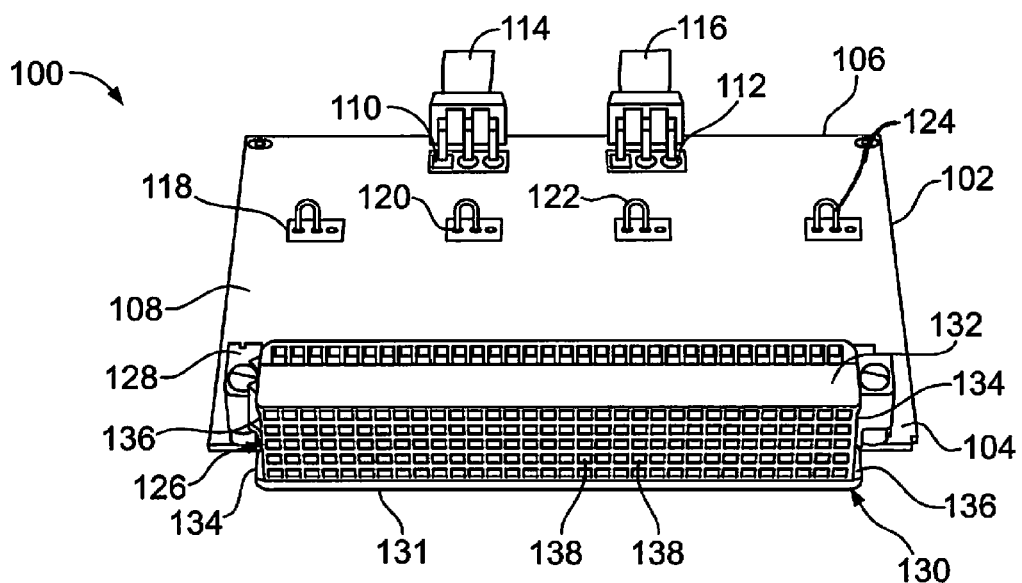
FIG. 1 is a diagrammatic representation of a perspective top view of a VME adapter assembly, according to an embodiment of the present disclosure.

FIG. 1 is a diagrammatic representation of a perspective top view of a VME adapter assembly 100, according to an embodiment of the present disclosure. The VME adapter assembly 100 may be configured as a discrete input VME adapter assembly 100. For example, the VME adapter assembly 100 may be a discrete input power and ground adapter that is configured to mate with a five row VME chassis, such as a VME64 chassis having five row backplane connectors. In at least one embodiment, the VME adapter assembly 100 may be a VME64x P2 five row adapter assembly.

The VME adapter assembly 100 may include an adapter circuit board 102 having a leading, chassis-mating edge 104 connected to a rear, system-connecting edge 106 through a main body 108. The chassis-mating edge 104 is opposite from the system-connecting edge 106. The chassis-mating edge 104 is configured to be inserted proximate to a VME chassis, such as that of a 5 row VME64x system, while the system-connecting edge 106 is configured to be distally located from the VME chassis, and closer to a system or connecting cable, for example. That is, when mated with a backplane connector of a VME chassis, the chassis-mating edge 104 is positioned closer to the VME chassis than the system-connecting edge 106.

An input contact area 110 and an output contact area 112 are formed proximate to the system-connecting edge 106, such as through etching, or the like. For example, the areas 110 and 112 are proximate to the system-connecting edge 106 in that they are closer to the system-connecting edge 106 than they are to the chassis-mating edge 104. An input housing 114 operatively couples to the input contact area 110, and is configured to connect to a cable (not shown in FIG. 1), which may retain electrical wires that electrically connect to the input contact area 110. Similarly, an output housing 116 operatively couples to the output contact area 112, and is configured to connect to a cable (not shown in FIG. 1), which may retain electrical wires that electrically connect to the output contact area 112.

The adapter circuit board 102 may also include a plurality of configuration selection areas or jumpers 118, 120, 122, and 124, which are configured to allow for a desired selection of different grouping of power and ground formation, for example. More or less configuration selection areas than shown may be used.

A mating contact area (hidden from view in FIG. 1) is formed proximate to the chassis-mating edge 104 and is operatively coupled to a mating plug housing 126. For example, the mating contact area is proximate to the chassis-mating edge 104 in that it is closer to the chassis-mating edge 104 than it is to the system-connecting edge 106. The mating plug housing 126 includes a board interface panel 128 that overlies the mating contact area. The board interface panel 128 includes a plurality of contacts, channels, apertures, plated-through-holes, or the like that align with a same number of contacts formed on the mating contact area. The board interface panel 128 integrally connects to a chassis interface insert 130 having a base 131 connected to an upper panel 132 through lateral panels 134. The base 131, the upper panel 132, and the lateral panels 134 define a mating interface area having five aligned rows 136 of contact apertures 138. The mating interface is complementary to a mating interface of a backplane connector of a VME chassis, such as that of a VME64x system. That is, the mating interface of the backplane connector of the VME chassis includes five aligned rows of contact pins that are configured to be received within the contact apertures 138 of the five aligned rows 136 when a mating connector having the VME adapter assembly 100 is plugged into the mating interface of the backplane connector.

In at least one embodiment, the VME adapter card assembly 100 is configured to be operatively coupled to one or more systems or subsystems, such as electrical systems, devices, components, or the like. The VME adapter card assembly 100 connects the system(s) or subsystem(s) to a 5 row VME chassis in a safe and reliable manner.

Figure 2:
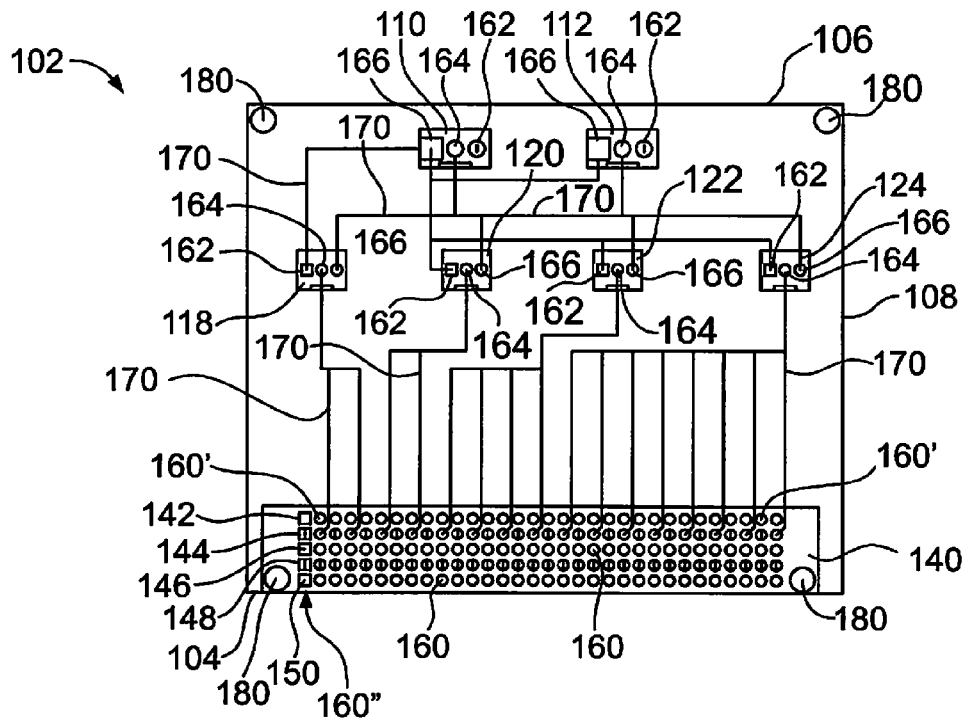
FIG. 2 is a diagrammatic representation of a top plan view of an adapter circuit board, according to an embodiment of the present disclosure.

FIG. 2 is a diagrammatic representation of a top plan view of the adapter circuit board 102, according to an embodiment of the present disclosure. As shown, the mating contact area 140 is formed proximate to the chassis-mating edge 104. Referring to FIGS. 1 and 2, the mating plug housing 126 may be a right angle connector in which the board interface panel 128 is parallel to and overlies the mating contact area 140, while the chassis interface insert 130 is perpendicular to the board interface panel 128. The mating contact area 140 includes five rows 142, 144, 146, 148, and 150 of contacts 160. Because the adapter circuit board 102 connects and adapts a system or subsystem to a five row VME chassis, not all of the rows of contacts may be active (e.g., operatively coupled to one or more active elements, such as signal, power, or ground contacts). For example, as shown, the rows 142, 146, and 150 are not active. That is, each of the rows 142, 146, and 150 are not operatively coupled to an active power, ground, or signal contact. In contrast, the rows 144 and 148 are active. Alternatively, other rows may be active in place of, or in addition to, the rows 144 and 148.

The input area 110 may include a ground contact 162, a signal contact 164, and a signal contact 166. Similarly, the output area 112 may include a ground contact 162, a signal contact 164, and a signal contact 166. The ground contacts 162 of each of the input area 110 and the output area 112 may connect to ground contacts 162 of the configuration selection areas 118, 120, 122, and 124 through one or more traces 170 (such as conductive copper traces), which may be formed on or within the adapter circuit board 102. Similarly, the signal contacts 164 of each of the input area 110 and the output area 112 may connect to signal contacts 164 of the configuration selection areas 118, 120, 122, and 124 through one or more traces 170, which may be formed on or within the adapter circuit board 102. Also, the signal contacts 166 of each of the input area 110 and the output area 112 may connect to signal contacts 166 of the configuration selection areas 118, 120, 122, and 124 through one or more traces 170, which may be formed on or within the adapter circuit board 102. While the traces 170 are shown in FIG. 2, it is to be understood that the traces 170 may be hidden by circuit board material.

As shown and described, each of the configuration selection areas 118, 120, 122, and 124 may be connected to the input and output areas 110 and 112 through one or more traces 170. Additionally, each of the configuration selection areas 118, 120, 122, and 124 may connect to contacts 160 of the mating contact area 140 through one or more traces 170.

The traces 170 may branch to connect to multiple contacts 160. For example, the configuration selection area 118 may connect to two contacts 160 within the row 144 through a branched trace 170. The two contacts 160 within the row 144 may be separated by a ground contact. Similarly, the configuration selection area 120 may connect to two contacts 160 within the row 144 through a branched trace 170, with a ground contact separating the two contacts 160. The configuration selection areas 122 and 124 may connect to contacts within the row 144 in a similar fashion. Alternatively, each configuration selection area 118, 120, 122, and 124 may be configured to connect to more contacts in the row 144 than shown. Additionally, the configuration selection areas 118, 120, 122, and 124 may connect to contacts within a different row than shown.

The contacts 160' within the row 142 may be smaller than the contacts in other rows. The smaller contacts 160' provide the adapter circuit board 102 with increased support surface therebetween, thereby allowing traces 170 to pass therebetween into the row 144. Alternatively, the contacts 160' may be the same size as the other contacts 160.

As shown, the rows 144 and 146 are active, while the rows 142, 146, and 150 are deactivated (or not in use). The row 144 includes signal contacts separated by ground contacts. The row 146 includes only ground contacts. Alternatively, the row 146 may include signal contacts, while the row 144 includes only ground contacts. Also, alternatively, each of the rows 144 and 146 may include signal and ground contacts.

Additionally, certain contacts 160 formed in the mating contact area 140 may be sized and shaped differently than other contacts 160, in order to provide keying contacts that ensure that the board interface panel 128 of the mating plug housing 126 (shown in FIG. 1) properly connects to the adapter circuit board 102. For example, leading keying contacts 160" of the rows 142, 144, 146, 148, and 150 may each have a keying shape that differs from the remainder of the contacts 160. For example, the leading keying contacts 160" may be square shaped and configured to connect to similar contacts of the board interface panel 128. In this manner, because the leading contacts 160" are at only one side, the board interface panel 128 is properly oriented and aligned to mate with the mating contact area 140, thereby ensuring that proper electrical connections are established therebetween. Optionally, the keying contacts 160" may be various other shapes and sizes. Also, alternatively, the keying contacts may be at various other locations of the mating contact area 140. Further, more or less keying contacts may be used.

The adapter circuit board 102 may also include fastener through holes 180. The fastener through holes 180 may be used to receive fasteners that are used to securely connect the adapter circuit board 102 to structure, such as the mating plug housing 126.

The input contact area 110 may connect to a component, such as a system or subsystem that connects to a VME chassis, through one or more electrical wires within a cable, for example. Notably, the output contact area 112 may connect to an input contact area of another VME adapter board through one or more electrical wires. Thus, separate and distinct cables or wires are not needed to connect the system to each and every adapter circuit board 102. Instead, a plurality of adapter circuit boards may be daisy-chained together. For example, a system may be connected to a first VME adapter board by connecting to an input contact area. The first VME adapter board then connects to a second VME adapter board through a wired connection between an output contact area of the first VME adapter board and an input contact area of the second VME adapter board. The second VME adapter board connects to a third VME adapter board in a similar fashion. As such, separate and distinct wires extending from either the system/subsystem or the VME chassis may not be needed to connect to each of the VME adapter boards.

Figure 3:
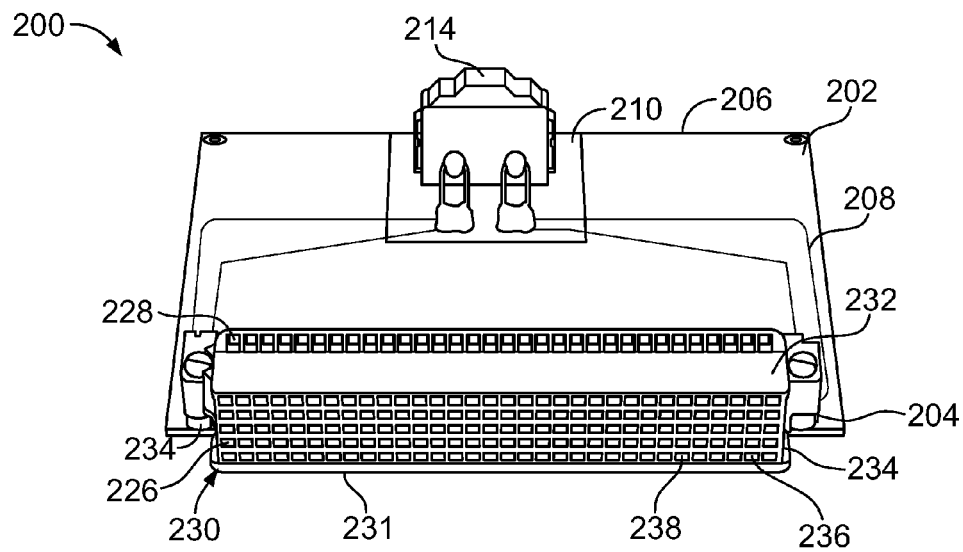
FIG. 3 is a diagrammatic representation of a perspective top view of a VME adapter assembly, according to an embodiment of the present disclosure.

FIG. 3 is a diagrammatic representation of a perspective top view of a VME adapter assembly 200, according to an embodiment of the present disclosure. The VME adapter assembly 200 may be configured as a discrete output VME adapter assembly 200. For example, the VME adapter assembly 200 may be a discrete output power and ground adapter configured for use with a VME64x backplane. In at least one embodiment, the VME adapter assembly 200 may be a VME64x P2 Five Row adapter assembly.

The VME adapter assembly 200 may include an adapter circuit board 202 having a leading, chassis-mating edge 204 connected to a rear, system-connecting edge 206 through a main body 208. A power contact area 210 is formed proximate to the system-connecting edge 206, such as through etching, or the like. A power input housing 214 operatively couples to the power contact area 210, and is configured to connect to a cable (not shown in FIG. 3), which may retain electrical wires that electrically connect to the power contact area 210.

A mating contact area (hidden from view in FIG. 3) is formed proximate to the chassis-mating edge 204 and is operatively coupled to a mating plug housing 226. The mating plug housing 226 includes a board interface panel 228 that overlies the mating contact area. The board interface panel 228 integrally connects to a chassis interface insert 230 having a base 231 connected to an upper panel 232 through lateral panels 234. The base 231, the upper panel 232, and the lateral panels 234 define a mating interface area having five aligned rows 236 of contact apertures 238. The mating interface is complementary to a mating interface of a backplane connector of a VME chassis. That is, the mating interface of the backplane connector of the VME chassis includes five aligned rows of contact pins that are configured to be received within the contact apertures 238 of the five aligned rows 236 when a mating connector having the VME adapter assembly 200 is plugged into the mating interface of the backplane connector.

In at least one embodiment, the VME adapter card assembly 200 is configured to be operatively coupled to one or more systems or subsystems, such as test systems or the like. The VME adapter card assembly 200 connects the system(s) or subsystem(s) to a 5 row VME chassis in a safe and reliable manner.

Figure 4:
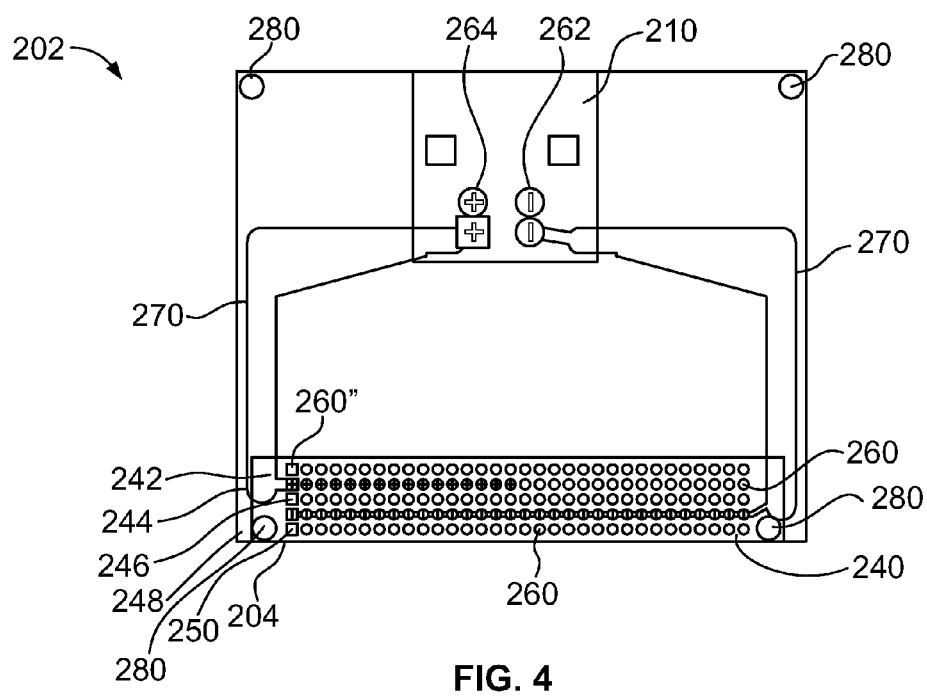
FIG. 4 is a diagrammatic representation of a top plan view of an adapter circuit board, according to an embodiment of the present disclosure.

FIG. 4 is a diagrammatic representation of a top plan view of the adapter circuit board 202, according to an embodiment of the present disclosure. The mating contact area 240 is formed proximate to the chassis-mating edge 204. The mating contact area 240 includes five rows 242, 244, 246, 248, and 250 of contacts 260. Because the adapter circuit board 202 is connecting and adapting a system or subsystem to a five row VME chassis, not all of the rows of contacts may be active. For example, as shown, the rows 242, 246, and 250 are not active. That is, each of the rows 242, 246, and 250 are not connected to an active power, ground, or signal contact. Conversely, the rows 244 and 248 are active. Alternatively, other rows may be active in place of, or in addition to, the rows 244 and 248. Referring to FIGS. 3 and 4, the mating plug housing 226 may be a right angle connector in which the board interface panel 228 is parallel to and overlies the mating contact area 240, while the chassis interface insert 230 is perpendicular to the board interface panel 228.

The power contact area 210 may include one or more ground contacts 262 and one or more power contacts 264. The ground contacts 262 connect to ground contacts 260 within the row 248 of the mating contact area 240 through a trace 270, which may be configured to accommodate high current signals. As shown, the entire row of contacts 260 within the row may be grounded. The power contacts 264 connect to power contacts 260 within the row 244 of the mating contact area 240 through a trace 270, which may be configured to accommodate high current signals. As shown, only half (or approximately half) the contacts within the row 244 may be configured as power contacts, while the remaining contacts are deactivated. Alternatively, more or less contacts within the row 244 may be power contacts. Also, alternatively, the traces may connect the power contact area 210 to other rows than shown.

Certain contacts 260 formed in the mating contact area 240 may be sized and shaped differently than other contacts 260, in order to provide keying contacts that ensure that the board interface panel 228 of the mating plug housing 226 (shown in FIG. 3) properly connects to the adapter circuit board 202. For example, leading keying contacts 260" of the rows 242, 244, 246, 248, and 250 may each have a keying shape that differs from the remainder of the contacts 260. For example, the leading keying contacts 260" may be square shaped and configured to connect to similar contacts of the board interface panel 228. In this manner, because the leading contacts 260" are at only one side, the board interface panel 228 is properly oriented and aligned to mate with the mating contact area 240, thereby ensuring that proper electrical connections are established therebetween. Optionally, the keying contacts 260" may be various other shapes and sizes. Also, alternatively, the keying contacts may be at various other locations of the mating contact area 240. Further, more or less keying contacts may be used.

The adapter circuit board 202 may also include fastener through holes 280. The fastener through holes 280 may be used to receive fasteners that are used to securely connect the adapter circuit board 202 to structure, such as the mating plug housing 226.

Figure 5:
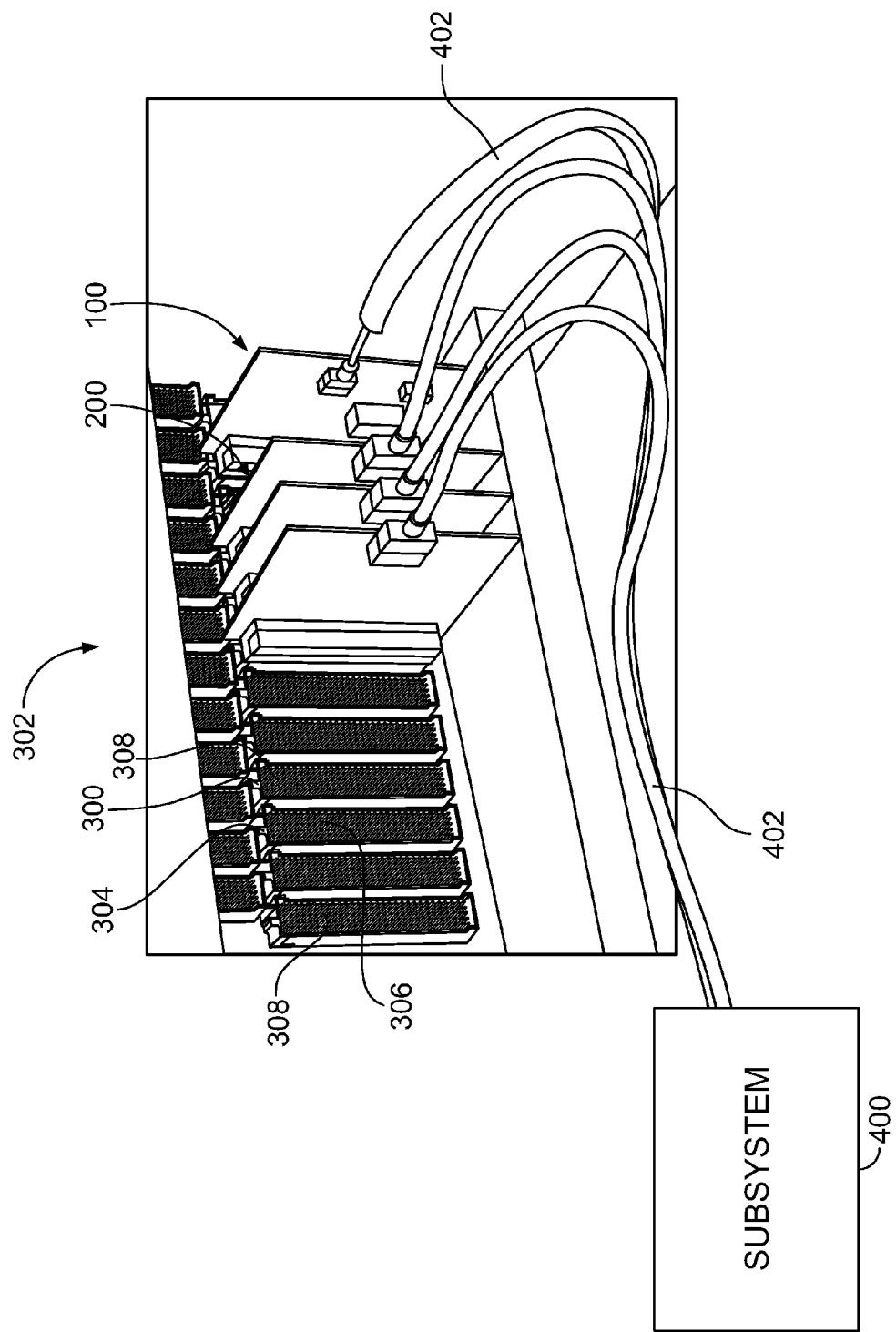
FIG. 5 is a diagrammatic representation of a rear view of a plurality VME adapter assemblies connected to backplane connectors of a VME chassis, according to an embodiment of the present disclosure.

FIG. 5 is a diagrammatic representation of a rear view of a plurality VME adapter assemblies 100 and 200 connected to backplane connectors 300 of a VME chassis 302 (such as that of a VME64x system), according to an embodiment of the present disclosure. For the sake of clarity, a rear wall portion of the VME chassis 302 is removed in order to show the connections between the VME adapter assemblies 100 and 200 and the backplane connectors 300.

Each backplane connector 300 may include an outer shroud 304 defining a connection chamber 306 having a plurality of pins 308. For example, the connection chamber 306 may include five rows of pins 308. The VME chassis 302 is a five row system that is configured to mate with mating connectors having five rows of reciprocal apertures. A subsystem 400 connects to the 5 row VME system through one or more cables 402 that connect to the VME adapter assemblies 100 and 200.

Referring to FIGS. 1-5, the VME adapter assemblies 100 and 200 include mating plug housings 126 and 226, respectively, which include chassis interface inserts 130 and 230, respectively. Each chassis interface insert 130 and 230 is configured to be plugged into a receptacle (upon rotating VME adapter assemblies 100 and 200 ninety degrees, for example), such as formed by the shrouds 304 of the backplane connectors 300. Inactive rows within each of the chassis interface inserts 130 and 230 provide space-filling structure so that the chassis interface inserts 130 and 230 are properly received within the shrouds 304.

Each of the chassis interface inserts 130 and 230 includes the same number of contact apertures 138 and 238 as the number of pins 308 within each connection chamber 306. In particular, the number and configuration of the contact apertures 138 and 238 corresponds to the number and configuration of the pins 308 within each connection chamber 306. In this manner, the VME adapter assemblies 100 and 200 properly and reliably mate within the backplane connectors 300, without the possibility of misalignment or being offset therein.

As noted, certain rows of contacts of each VME adapter assembly 100 and 200 may be inactive. However, the inactive rows provide space-filling structure that is used to properly position and orient active contacts (e.g., those contacts that are grounded or connected to power or signal contacts) to ensure a proper aligned mating relationship between pins 308 within the backplane connectors 300. As such, the VME adapter assemblies 100 and 200 provide a safe, reliable connection interface between the five row VME system and a system or subsystem, such as a testing system in a laboratory environment. The VME adapter assemblies 100 and 200 ensure proper connection with the backplane connectors 300, and thereby prevent or otherwise reduce the risk of damaging components of the VME chassis 302, the VME adapter assemblies 100 and 200, and/or the subsystem 400.

The VME chassis 302 may be operatively coupled to the subsystem 400 through the VME adapter assemblies 100 and 200 in order to monitor and test various components of the subsystem 400. The subsystem 400 may be a subsystem of a vehicle, such as an aircraft, for example. For example, the subsystem 400 may be an electrical subsystem that is configured to be used within an aircraft. Before being mounted and secured in the aircraft, the subsystem 400 may first be tested within a laboratory to ensure that the subsystem properly operates. As such, the subsystem 400 may be connected to the VME chassis 302 through one or more VME adapter assemblies 100 and 200.

Embodiments of the present disclosure provide VME adapter card assemblies that may include five row connection interfaces that are configured to mate with reciprocal backplane connectors of a five row VME system. As such, embodiments of the present disclosure ensure proper and correct connection and prevent damage that could otherwise occur when connecting a subsystem to a five row VME system.

Figure 6:
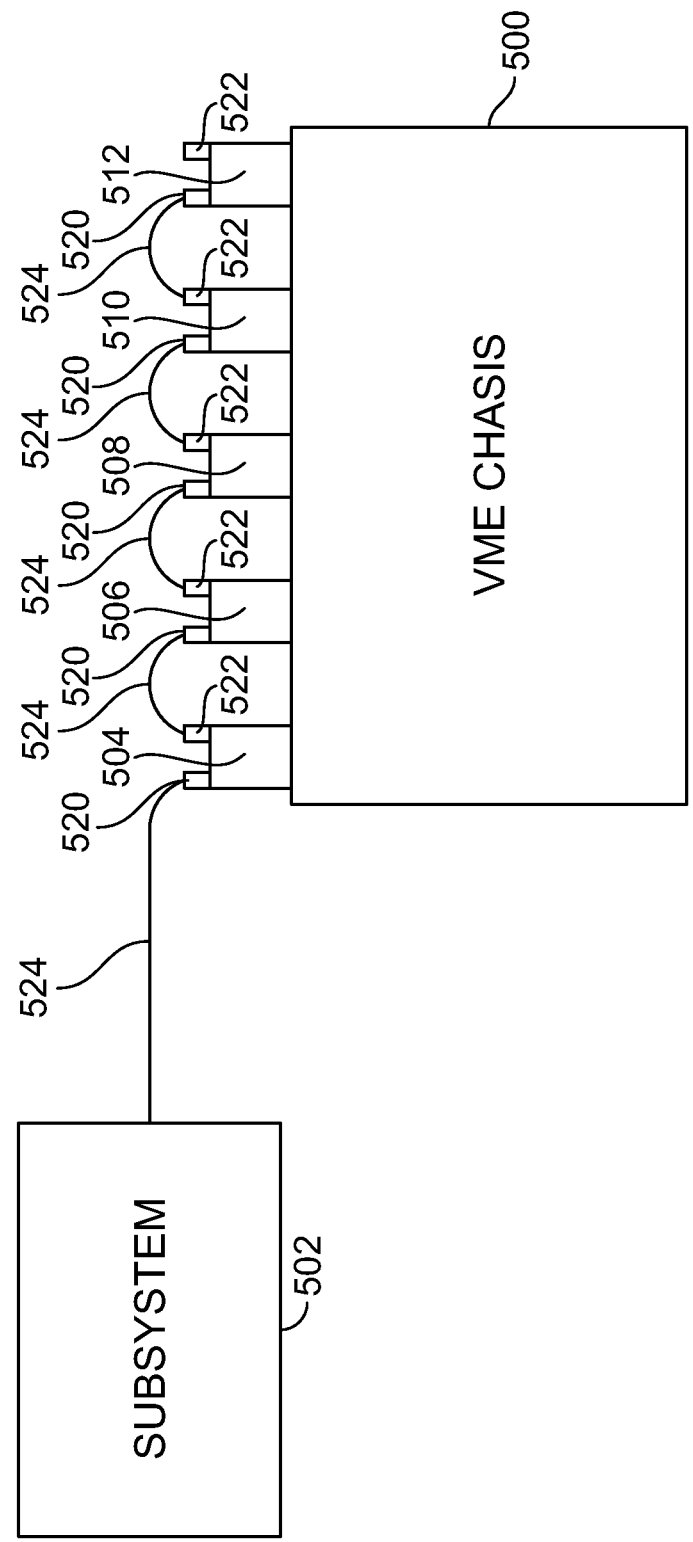
FIG. 6 is a simplified schematic diagram of VME chassis operatively coupled to a system, according to an embodiment of the present disclosure.

FIG. 6 is a simplified schematic diagram of VME chassis 500 operatively coupled to a subsystem 502, according to an embodiment of the present disclosure. As shown, the VME chassis 500 operatively couples to the subsystem 502 through a plurality of VME adapter assemblies 504, 506, 508, 510, and 512, such as any of those described above. More or less VME assemblies than shown may be used.

The VME chassis may be a 5 row VME system. The adapter assemblies 504-512 allow for safe, reliable connection between the subsystem 502 and the VME chassis 500.

The subsystem 502 connects to an input contact area 520 of the VME adapter assembly 504 through a cable 524, for example. In turn, an output contact area 522 of the VME adapter assembly 504 connects to an input contact area 520 of the VME adapter assembly 506 through an intermediate cable 524. The output contact area 522 of the VME adapter assembly 506 connects to an input contact area 520 of the VME adapter assembly 508 through an intermediate cable 524, and so on. As such, each of the VME adapter assemblies 504-512 may be daisy-chained together, instead of connecting to the subsystem 502 and/or the VME chassis 500 through separate and distinct cables extending therebetween. In this manner, embodiments of the present disclosure reduce wiring and clutter between the VME chassis 500 and the subsystem 502.

Figure 7:
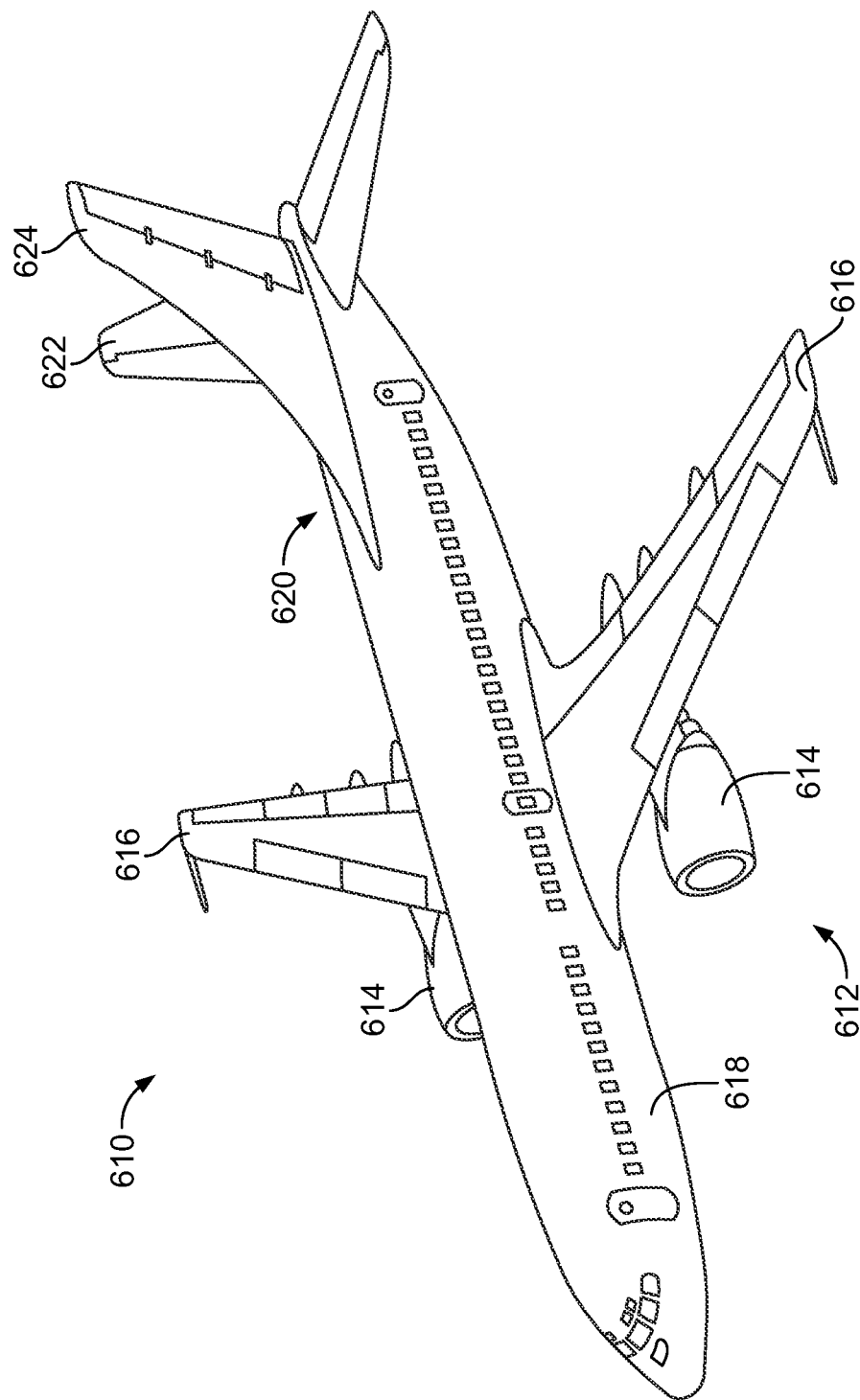
FIG. 7 is a diagrammatic representative of a perspective top view of an aircraft, according to an embodiment of the present disclosure.

FIG. 7 is a diagrammatic representative of a perspective top view of an aircraft 610 (or aircraft assembly), according to an embodiment of the present disclosure. Embodiments of the present disclosure provide systems, methods, and assemblies that are configured to monitor, test, or the like various subsystems of the aircraft 610 before the various subsystems are mounted in the aircraft 610. As an example, the VME systems described in the present application may be used to test and simulate various aircraft functions and operations while interfacing to subsystems, such as black boxes, within a laboratory setting. In at least one embodiment, one or more of the subsystems of the aircraft 610 are connected to a five row VME chassis within a laboratory through one or more VME adapter assemblies prior to the subsystems being secured within the aircraft 610. Alternatively, instead of an aircraft, the systems and methods of embodiments of the present disclosure may be used to test subsystems of various other vehicles (such as automobiles, buses, locomotives and train cars, seacraft, spacecraft, and the like), devices, structures, and the like.

The aircraft 610 may include a propulsion system 612 that may include two turbofan engines 614, for example. Optionally, the propulsion system 612 may include more engines 614 than shown. The engines 614 are carried by wings 616 of the aircraft 610. In other embodiments, the engines 614 may be carried by a fuselage 618 and/or an empennage 620. The empennage 620 may also support horizontal stabilizers 622 and a vertical stabilizer 624.

VME systems are particularly well-suited for testing subsystems that are later secured within aircraft. In particular, an aircraft has a large number of varied electrical subsystems. VME systems are configured to test large scale systems, such as those that are to be secured within or to aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A Versa Module Europa (VME) adapter assembly configured to operatively couple a subsystem to a five row VME chassis, the VME adapter assembly comprising:
an adapter circuit board having a mating contact area proximate to a chassis-mating edge, and at least one area that is configured to couple to the subsystem, wherein the at least one area of the adapter circuit board comprises a power contact area; and
a mating plug housing that overlies at least a portion of the mating contact area of the adapter circuit board, wherein the mating plug housing comprises a chassis interface insert defining a mating interface area having five aligned rows of contact apertures, wherein the five aligned rows of contact apertures are configured to mate with a same number of aligned rows of contact pins within a backplane connector of the five row VME chassis.

2. The VME adapter assembly of claim 1, wherein the adapter circuit board is a discrete input adapter circuit board.

3. The VME adapter assembly of claim 1, wherein the adapter circuit board is a discrete output adapter circuit board.

4. The VME adapter assembly of claim 1, wherein the at least one area of the adapter circuit board comprises:
an input contact area configured to couple to a first cable that connects to the subsystem; and
an output contact area configured to couple to a second cable that couples to a different input contact area of a different VME adapter assembly.

5. The VME adapter assembly of claim 1, wherein the at least one area of the adapter circuit board comprises a plurality of configuration selection areas, wherein each of the plurality of configuration selection areas is configured to allow for a desired selection of power and ground formation.

6. The VME adapter assembly of claim 1, wherein the mating contact area includes five rows of contacts connected to the five aligned rows of contact apertures.

7. The VME adapter assembly of claim 6, wherein less than all of the contacts within the mating contact area are active.

8. The VME adapter assembly of claim 6, wherein each of the contacts within at least one of the five rows of the mating contact area are deactivated.

9. The VME adapter assembly of claim 6, wherein only two of the five rows within the mating contact area are active, wherein one of the two of the five rows within the mating contact area includes alternating signal and ground contacts, and wherein the other of the two of the five rows within the mating contact area includes only ground contacts.

10. The VME adapter assembly of claim 6, wherein at least one of the contacts within the mating contact area comprises a keying shape configured to ensure proper orientation of the adapter circuit board with respect to the mating plug housing.

11. The VME adapter assembly of claim 6, wherein at least one of the five rows within the mating contact area includes different shaped contacts to facilitate routing of traces therebetween.

12. A system comprising:
a subsystem configured to be tested;
a five row VME chassis comprising a plurality of backplane connectors; and
a plurality of Versa Module Europa (VME) adapter assemblies operatively coupling the subsystem to the five row VME chassis, wherein each of the VME adapter assemblies comprises:
an adapter circuit board comprising a power contact area, a mating contact area proximate to a chassis-mating edge, and at least one area proximate to a system-connecting edge that is configured to couple to the subsystem, wherein the mating contact area includes five rows of contacts; and
a mating plug housing that overlies at least a portion of the mating contact area of the adapter circuit board, wherein the mating plug housing comprises a chassis interface insert defining a mating interface area having five aligned rows of contact apertures connected to the five rows of contacts of the mating contact area at a right angle, wherein the five aligned rows of contact apertures mate with a same number of aligned rows of contact pins within the backplane connector of the five row VME chassis, and wherein each of the adapter circuit board is one of a discrete input adapter circuit board or a discrete output adapter circuit board.

13. The system of claim 12, wherein the at least one area of the adapter circuit board of at least one of the VME adapter assemblies further comprises:
an input contact area configured to couple to a first cable that connects to the system;
an output contact area configured to couple to a second cable that couples to a different input contact area of a different VME adapter assembly; and
a plurality of configuration selection areas, wherein each of the plurality of configuration selection areas is configured to allow for a desired selection of power and ground formation.

14. The system of claim 12, wherein less than all of the contacts within the mating contact area are active.

15. The system of claim 12, wherein only two of the five rows within the mating contact area are active, wherein one of the two of the five rows within the mating contact area includes alternating signal and ground contacts, and wherein the other of the two of the five rows within the mating contact area includes only ground contacts.

16. The system of claim 12, wherein at least one of the contacts within the mating contact area comprises a keying shape configured to ensure proper orientation of the adapter circuit board with respect to the mating plug housing.

17. The system of claim 12, wherein at least one of the five rows includes different shaped contacts to facilitate routing of traces therebetween.

18. A Versa Module Europa (VME) adapter assembly configured to operatively couple a subsystem to a five row VME chassis, the VME adapter assembly comprising:
an adapter circuit board having a mating contact area proximate to a chassis-mating edge, and at least one area that is configured to couple to the subsystem, wherein the at least one area of the adapter circuit board comprises: (a) an input contact area configured to couple to a first cable that connects to the subsystem;

and (b) an output contact area configured to couple to a second cable that couples to a different input contact area of a different VME adapter assembly; and a mating plug housing that overlies at least a portion of the mating contact area of the adapter circuit board, wherein the mating plug housing comprises a chassis interface insert defining a mating interface area having five aligned rows of contact apertures, wherein the five aligned rows of contact apertures are configured to mate with a same number of aligned rows of contact pins within a backplane connector of the five row VME chassis.

19. The VME adapter assembly of claim 18, wherein the at least one area of the adapter circuit board comprises a plurality of configuration selection areas, wherein each of the plurality of configuration selection areas is configured to allow for a desired selection of power and ground formation.

20. The VME adapter assembly of claim 18, wherein the mating contact area includes five rows of contacts connected to the five aligned rows of contact apertures, wherein only two of the five rows within the mating contact area are active, wherein one of the two of the five rows within the mating contact area includes alternating signal and ground contacts, and wherein the other of the two of the five rows within the mating contact area includes only ground contacts.

21. A Versa Module Europa (VME) adapter assembly configured to operatively couple a subsystem to a five row VME chassis, the VME adapter assembly comprising:

an adapter circuit board having a mating contact area proximate to a chassis-mating edge, and at least one area that is configured to couple to the subsystem, wherein the at least one area of the adapter circuit board comprises a plurality of configuration selection areas, wherein each of the plurality of configuration selection areas is configured to allow for a desired selection of power and ground formation; and a mating plug housing that overlies at least a portion of the mating contact area of the adapter circuit board, wherein the mating plug housing comprises a chassis interface insert defining a mating interface area having five aligned rows of contact apertures, wherein the five aligned rows of contact apertures are configured to mate with a same number of aligned rows of contact pins within a backplane connector of the five row VME chassis.

22. The VME adapter assembly of claim 21, wherein the mating contact area includes five rows of contacts connected to the five aligned rows of contact apertures, wherein only two of the five rows within the mating contact area are active, wherein one of the two of the five rows within the mating contact area includes alternating signal and ground contacts, and wherein the other of the two of the five rows within the mating contact area includes only ground contacts.

23. A Versa Module Europa (VME) adapter assembly configured to operatively couple a subsystem to a five row VME chassis, the VME adapter assembly comprising:

an adapter circuit board having a mating contact area proximate to a chassis-mating edge, and at least one area that is configured to couple to the subsystem, wherein the mating contact area includes five rows of contacts connected to the five aligned rows of contact apertures, wherein only two of the five rows within the mating contact area are active, wherein one of the two of the five rows within the mating contact area includes alternating signal and ground contacts, and wherein the other of the two of the five rows within the mating contact area includes only ground contacts; and a mating plug housing that overlies at least a portion of the mating contact area of the adapter circuit board, wherein the mating plug housing comprises a chassis interface insert defining a mating interface area having five aligned rows of contact apertures, wherein the five aligned rows of contact apertures are configured to mate with a same number of aligned rows of contact pins within a backplane connector of the five row VME chassis.

24. A system comprising:

a subsystem configured to be tested;

a five row VME chassis comprising a plurality of backplane connectors; and a plurality of Versa Module Europa (VME) adapter assemblies operatively coupling the subsystem to the five row VME chassis, wherein each of the VME adapter assemblies comprises:

an adapter circuit board having a mating contact area proximate to a chassis-mating edge, and at least one area proximate to a system-connecting edge that is configured to couple to the subsystem, wherein the mating contact area includes five rows of contacts, wherein the at least one area of the adapter circuit board of at least one of the VME adapter assemblies further comprises: (a) an input contact area configured to couple to a first cable that connects to the system; (b) an output contact area configured to couple to a second cable that couples to a different input contact area of a different VME adapter assembly; and (c) a plurality of configuration selection areas, wherein each of the plurality of configuration selection areas is configured to allow for a desired selection of power and ground formation; and a mating plug housing that overlies at least a portion of the mating contact area of the adapter circuit board, wherein the mating plug housing comprises a chassis interface insert defining a mating interface area having five aligned rows of contact apertures connected to the five rows of contacts of the mating contact area at a right angle, wherein the five aligned rows of contact apertures mate with a same number of aligned rows of contact pins within the backplane connector of the five row VME chassis, and wherein each of the adapter circuit board is one of a discrete input adapter circuit board or a discrete output adapter circuit board.

25. The system of claim 24, wherein only two of the five rows within the mating contact area are active, wherein one of the two of the five rows within the mating contact area includes alternating signal and ground contacts, and wherein the other of the two of the five rows within the mating contact area includes only ground contacts.

26. The system of claim 24, wherein at least one of the five rows includes different shaped contacts to facilitate routing of traces therebetween.

27. A system comprising:

a subsystem configured to be tested;

a five row VME chassis comprising a plurality of backplane connectors; and a plurality of Versa Module Europa (VME) adapter assemblies operatively coupling the subsystem to the five row VME chassis, wherein each of the VME adapter assemblies comprises:

an adapter circuit board having a mating contact area proximate to a chassis-mating edge, and at least one area proximate to a system-connecting edge that is configured to couple to the subsystem, wherein the mating contact area includes five rows of contacts, wherein only two of the five rows within the mating contact area are active, wherein one of the two of the five rows within the mating contact area includes alternating signal and ground contacts, and wherein the other of the two of the five rows within the mating contact area includes only ground contacts; and a mating plug housing that overlies at least a portion of the mating contact area of the adapter circuit board, wherein the mating plug housing comprises a chassis interface insert defining a mating interface area having five aligned rows of contact apertures connected to the five rows of contacts of the mating contact area at a right angle, wherein the five aligned rows of contact apertures mate with a same number of aligned rows of contact pins within the backplane connector of the five row VME chassis, and wherein each of the adapter circuit board is one of a discrete input adapter circuit board or a discrete output adapter circuit board.

28. A system comprising:

a subsystem configured to be tested;

a five row VME chassis comprising a plurality of backplane connectors; and a plurality of Versa Module Europa (VME) adapter assemblies operatively coupling the subsystem to the five row VME chassis, wherein each of the VME adapter assemblies comprises:

an adapter circuit board having a mating contact area proximate to a chassis-mating edge, and at least one area proximate to a system-connecting edge that is configured to couple to the subsystem, wherein the mating contact area includes five rows of contacts, wherein at least one of the five rows includes different shaped contacts to facilitate routing of traces therebetween; and a mating plug housing that overlies at least a portion of the mating contact area of the adapter circuit board, wherein the mating plug housing comprises a chassis interface insert defining a mating interface area having five aligned rows of contact apertures connected to the five rows of contacts of the mating contact area at a right angle, wherein the five aligned rows of contact apertures mate with a same number of aligned rows of contact pins within the backplane connector of the five row VME chassis, and wherein each of the adapter circuit board is one of a discrete input adapter circuit board or a discrete output adapter circuit board.

* * * * *